United States Patent
Swett (10) Patent No.: US 12,146,670 B2
(45) Date of Patent: Nov. 19, 2024

(54) ISOTHERMAL-TURBO-COMPRESSOR-EXPANDER-CONDENSER-EVAPORATOR DEVICE

(71) Applicant: Appollo Wind Technologies LLC, Saint Petersburg, FL (US)

(72) Inventor: Peter A. Swett, Reading, MA (US)

(73) Assignee: Appollo Wind Technologies LLC, Saint Petersburg, FL (US)

(*) Notice: Subject to any disclaimer, the term of this patent is extended or adjusted under 35 U.S.C. 154(b) by 19 days.

(21) Appl. No.: 18/220,214

(22) Filed: Jul. 10, 2023

(65) Prior Publication Data

US 2024/0044527 A1 Feb. 8, 2024

Related U.S. Application Data

(63) Continuation of application No. 16/565,399, filed on Sep. 9, 2019, now Pat. No. 11,698,198, which is a continuation of application No. 14/942,850, filed on Nov. 16, 2015, now abandoned.

(60) Provisional application No. 62/080,996, filed on Nov. 17, 2014.

(51) Int. Cl.
*F24F 1/027* (2019.01)
*B60H 1/32* (2006.01)
*F25B 3/00* (2006.01)

(52) U.S. Cl.
CPC ........... *F24F 1/027* (2013.01); *B60H 1/3223* (2013.01); *F25B 3/00* (2013.01)

(58) Field of Classification Search
CPC ........... F24F 1/027; B60H 1/3223; F25B 3/00

USPC .......................................................... 62/115
See application file for complete search history.

(56) References Cited

U.S. PATENT DOCUMENTS

| | | | |
|---|---|---|---|
| 2,309,224 A * | 1/1943 | Terry | F24F 1/031 |
| | | | 62/262 |
| 2,393,338 A | 1/1946 | Roebuck | |
| 2,424,878 A | 7/1947 | Crook | |
| 2,522,781 A | 9/1950 | Arturo | |
| 3,332,253 A | 7/1967 | Alexander | |
| 3,470,704 A * | 10/1969 | Kantor | F25B 3/00 |
| | | | 62/499 |
| 3,896,635 A * | 7/1975 | Stewart | F25B 3/00 |
| | | | 62/499 |

(Continued)

FOREIGN PATENT DOCUMENTS

| | | |
|---|---|---|
| BE | 654270 | 10/1964 |
| EP | 1790933 A1 | 5/2007 |

(Continued)

*Primary Examiner* — Eric S Ruppert
*Assistant Examiner* — Kirstin U Oswald
(74) *Attorney, Agent, or Firm* — Loginov & Associates, PLLC; William A. Loginov (57) ABSTRACT

This invention provides an isothermal turbo-compressor-expander-condenser-evaporator in a single integral arrangement that is suitable for a variety of compact arrangements, such as a window air-conditioner and/or automotive-based unit. This arrangement avoids the use of rotary fluid joints and maintains the entire fluid cycle, including compression, condensation, expansion and evaporation within a single rotating shaft-based structure, with the compressor/condenser section and the expansion/evaporator section separated from each other in separate spaces and/or plena by a rotating, insulated barrier disc and associated seal.

12 Claims, 5 Drawing Sheets

(56) References Cited

U.S. PATENT DOCUMENTS

| | | | | |
|---|---|---|---|---|
| 3,981,627 | A * | 9/1976 | Kantor | F25B 15/004 417/244 |
| 3,990,243 | A * | 11/1976 | Davoud | F02G 1/0435 60/645 |
| 3,999,402 | A * | 12/1976 | Nelson | F25B 19/00 62/403 |
| 4,027,993 | A * | 6/1977 | Wolff | F01K 25/04 96/359 |
| 4,077,230 | A | 3/1978 | Eskeli | |
| 4,117,695 | A | 10/1978 | Hargreaves | |
| 4,178,766 | A | 12/1979 | Eskeli | |
| 4,242,878 | A | 1/1981 | Brinkerhoff | |
| 4,282,716 | A | 8/1981 | Momose | |
| 4,311,025 | A | 1/1982 | Rice | |
| 4,420,944 | A | 12/1983 | Dibrell | |
| 4,420,945 | A | 12/1983 | Dibrell | |
| 4,464,908 | A | 8/1984 | Landerman | |
| 4,513,575 | A | 4/1985 | Dibrell | |
| 4,524,587 | A | 6/1985 | Kantor | |
| 4,864,826 | A * | 9/1989 | Lagow | F01B 17/00 60/692 |
| 5,381,675 | A * | 1/1995 | Siegel | F04B 45/022 62/268 |
| 5,386,685 | A | 2/1995 | Frutschi | |
| 5,467,613 | A * | 11/1995 | Brasz | F25B 11/02 60/671 |
| 5,477,688 | A | 12/1995 | Ban | |
| 5,674,053 | A | 10/1997 | Paul | |
| 5,839,270 | A | 11/1998 | Jirnov | |
| 8,578,733 | B2 | 11/2013 | Roisin | |
| 10,041,701 | B1 * | 8/2018 | Koplow | F28F 5/02 |
| 2010/0180631 | A1 * | 7/2010 | Roisin | B60H 1/3223 415/206 |
| 2011/0146951 | A1 * | 6/2011 | Hoos | F25B 3/00 165/81 |
| 2012/0117990 | A1 * | 5/2012 | Rached | C09K 5/045 62/115 |
| 2014/0069138 | A1 | 3/2014 | Roisin | |
| 2016/0102631 | A1 * | 4/2016 | Lynn | F01K 11/04 60/517 |
| 2016/0138612 | A1 | 5/2016 | Swett | |

FOREIGN PATENT DOCUMENTS

| | | |
|---|---|---|
| WO | 0175290 A1 | 10/2001 |
| WO | 2006017888 A1 | 2/2006 |
| WO | 2008018812 A1 | 2/2008 |

\* cited by examiner

ISOTHERMAL-TURBO-COMPRESSOR-EXPANDER-CONDENSER-EVAPORATOR DEVICE

RELATED APPLICATION

This application is a continuation of U.S. patent application Ser. No. 16/565,399, entitled ISOTHERMAL-TURBO-COMPRESSOR-EXPANDER-CONDENSER-EVAPORATOR DEVICE, filed Sep. 9, 2019, which is a continuation of U.S. patent application Ser. No. 14/942,850, entitled ISOTHERMAL-TURBO-COMPRESSOR-EXPANDER-CONDENSER-EVAPORATOR DEVICE, filed Nov. 16, 2015, which claims the benefit of U.S. Provisional Application Ser. No. 62/080,996, entitled ISOTHERMAL-TURBO-COMPRESSOR-EXPANDER-CONDENSER-EVAPORATOR DEVICE, filed Nov. 17, 2014, the entire teaching of each of which applications is expressly incorporated herein by reference.

FIELD OF THE INVENTION

This invention relates to air conditioning, heating, heat pumps, refrigeration, and similar heat-exchange devices, and more particularly to devices capable of being contained in a limited space

BACKGROUND OF THE INVENTION

A disadvantage to conventional air-conditioning and heat pump arrangements that employ an evaporative/condensing, phase-changing compound, such as refrigerant arrangement is that they require a compressor to first pressurize the refrigerant so that it becomes a high-pressure, heated gas, a condenser for providing the heat exchange required to cool down the refrigerant before it passes into the coil within the refrigerant compartment, and an expansion valve. This typically requires the use of three separate and discrete devices, one for performing each process within the air-conditioning/refrigeration cycle, all interconnected by fluid-tight appropriate tubing. This reduces efficiency and increases component count and cost. More particularly, it is a well-established principle of thermodynamics that, at identical pressures, more energy is required to compress a gas at a higher temperature than the same gas at a lower temperature. Thus, compression with delay of heat expulsion until completion of the compression requires more energy than compression with anticipated heat expulsion during the compression. The ability to implement this process in a more-isothermal manner, in which heat is removed from the refrigerant concurrently with the compression, can provide a more-efficient overall cycle.

Various systems have attempted to overcome the various disadvantages of a conventional air conditioning, refrigeration and/or heat pump arrangement, including providing systems having multi-stage compression components separated by intermediate cooling stages; and/or systems with expansion through a turbine sharing a rotating shaft with the compressor. However, these systems typically require an increased component count relative to a conventional arrangement—for example a first-stage compressor, flash chamber, heat exchanger, and second-stage compressor. These multi-stage systems have typically been limited to large-scale refrigeration systems due to the number of components (and associated higher cost) required for operation. This cost and complexity renders such systems, undesirable for smaller scale air-conditioning and refrigeration applications, or those deployed in a relatively confined space, such as a window air conditioner, or automotive air conditioning system.

In other prior art arrangements, piston-type compressors are provided that include cooling jackets that remove heat from the compressor wall to enhance isothermalism, and/or intermediate heat exchangers between the stages of a multi-stage compressor assembly. However, these compressors operate with a reciprocating piston that does not allow sufficient physical proximity between the refrigerant under compression (inside the piston chamber) and the fluid (such as atmospheric air) used for the cooling, and only a fraction of the heat can be extracted during the compression. Thus, these (and other prior art systems) do not allow for a large portion of cooling (and condensation) to desirably occur during the compression cycle to improve efficiency.

Commonly assigned U.S. Pat. No. 8,578,733 (hereinafter '733), entitled TURBO-COMPRESSOR-CONDENSER-EXPANDER, which is herein incorporated by reference as useful background information, describes a refrigeration, air-conditioning and heat-transfer system that overcomes various disadvantages of conventional and prior art arrangements, by providing a device that reduces the number of interconnected, discrete components so as to provide for increased fluid-tightness over a long service life, as well as potentially reduced production costs and increases overall reliability. This system provides a single apparatus capable of performing simultaneous refrigerant compression, condensation, and expansion, thereby improving efficiency and overall design of air-conditioning, refrigeration and heat-pumping systems.

The '733 patent discloses a design for a highly efficient isothermal turbo-compressor-condenser-expander, that employs rotary fluid unions to interface the rotating components with the stationary components of the refrigeration apparatus. In various implementations, rotary fluid unions can incur additional frictional losses and potentially pose a leak point for emissions of environmentally deleterious refrigerants if they are utilized. Such rotary fluid unions may also limit the maximum operating pressures for refrigerant fluids, and hence can limit potential refrigerant selection to those with greater-than-ambient absolute pressure while operating to prevent leaks inward with resultant refrigerant contamination.

Additionally, the devices described in the '733 patent may be directed more toward a limited number of operating points over a range of refrigeration capacity, making this arrangement less-suited to certain implementations in which a wide operating range is desired (e.g. window air conditioners and automotive units). The refrigeration process disclosed in the '733 patent is also inherently limited from reaching the maximum efficiency possible, as the pressure range over which the refrigerant is expanded isentropically does not have much work available due to a limited change in volume.

Thus, it is desirable to provide various improvements to the implementation of '733 to more closely realize its full potential for improved energy efficiency, and confer additional practical advantages in implementation.

SUMMARY OF THE INVENTION

This invention overcomes disadvantages of prior art by providing an isothermal turbo-compressor-expander-condenser-evaporator in a single integral arrangement that is suitable for a variety of compact arrangements, such as a window air-conditioner and/or automotive-based unit. This arrangement avoids the use of rotary fluid joints and maintains the entire fluid cycle, including compression, condensation, expansion and evaporation within a single rotating shaft-based structure, with the compressor/condenser section and the expansion/evaporator section separated from each other in separate spaces and/or plena by a rotating, insulated barrier disc and associated seal.

In an illustrative embodiment, a turbo-compressor-condenser-expander-evaporator (TCCEE) for a refrigerant is provided. A central axis assembly, including a first compressor stage, provides isentropic adiabatic mechanical compression in the refrigerant, and a second compressor stage, provides isothermal centrifugal compression in radially expanding refrigerant-filled conduits. The conduits are arranged in surfaces to induce heat transfer and a first air flow to remove heat of compression and condensation. The central axis assembly further includes an expander and evaporator stage, receiving the compressed and condensed refrigerant from the second compression stage. It provides isentropic centrifugal expansion and isothermal expansion and evaporation in radially contracting conduits. The conduits are arranged to induce a second air flow over surfaces of the condenser and evaporator. A prime mover rotates the central axial assembly to supply energy sufficient to compress refrigerant and circulate the first air flow and the second air flow through the device. Illustratively, a stationary plenum collects and directs the second air flow by the rotating action of the surfaces of the condenser and evaporator. The surfaces of the condenser and evaporator define generally blade-shaped conduits carrying refrigerant therein. Further, an insulated barrier disc can be attached to the central axle axial assembly and closely fit to the stationary plenum to minimize air leakage between the insulated barrier disc and the stationary plenum. An additional stationary plenum can be arranged around the surfaces of the compressor and condenser to collect and direct the air warmed by compression and condensation.

In embodiments, a diverter assembly can be operatively connected with each of the stationary plenum and the additional stationary plenum. This diverter assembly, in conjunction with the plena, is constructed and arranged so that a destination and a source of hot air and cold air are interchangeable. In embodiments, the compressor includes a compressor shaft and a compressor shaft anchor attached to an independent motor shaft of the prime mover. The compressor shaft anchor can be interfaced into a planetary gear transmission driven from a central axial shaft to drive the compressor shaft at a speed multiple of the central axial shaft. Illustratively, the first compressor stage can comprise a shaft-driven mechanical compressor coupled through a sealed shaft or magnetic coupling attached to a stationary anchor and the mechanical compressor can comprise a digital scroll compressor in which the prime mover (drive motor) rotates at a constant speed.

In illustrative embodiments, a housing encloses the components, in which the housing defines a window-mounted air conditioning unit.

In various embodiments, the refrigerant can comprises a high-molecular-weight refrigerant working fluid with less than atmospheric pressure compressor suction conditions, and more particularly R-123 and/or "hydrofluoroolefin analogues: intended for centrifugal compressors. Such analogues can include, but are not limited to DR-2, HFO1234yf, and DR-11, (e.g.) HFO1234ze and similar compounds, as well as those that can be developed in the future, from such well-known international maufacturers, such as Honeywell and DuPont.

BRIEF DESCRIPTION OF THE DRAWINGS

The invention description below refers to the accompanying drawings, of which.

DETAILED DESCRIPTION

I. ITCCEE Structure and Operation

Figure 1:
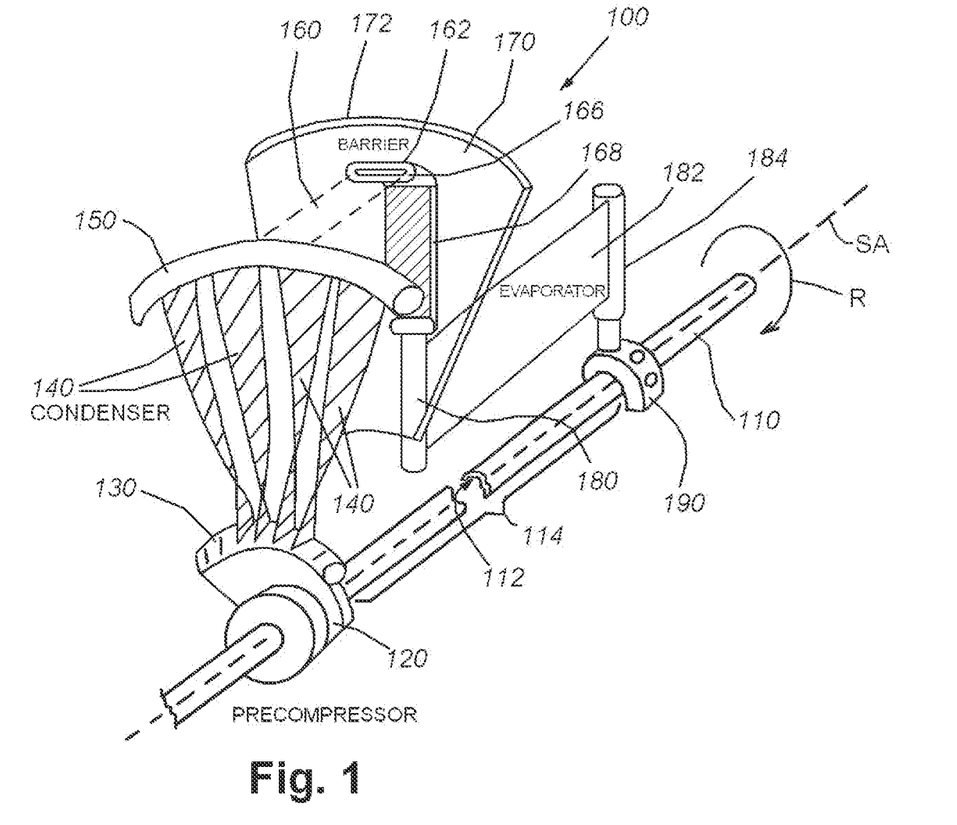
FIG. 1 is a fragmentary perspective view of an isothermal turbo-compressor-compressor-condenser-expander-evaporator (ITCCEE) according to an illustrative embodiment.
Figure 2:
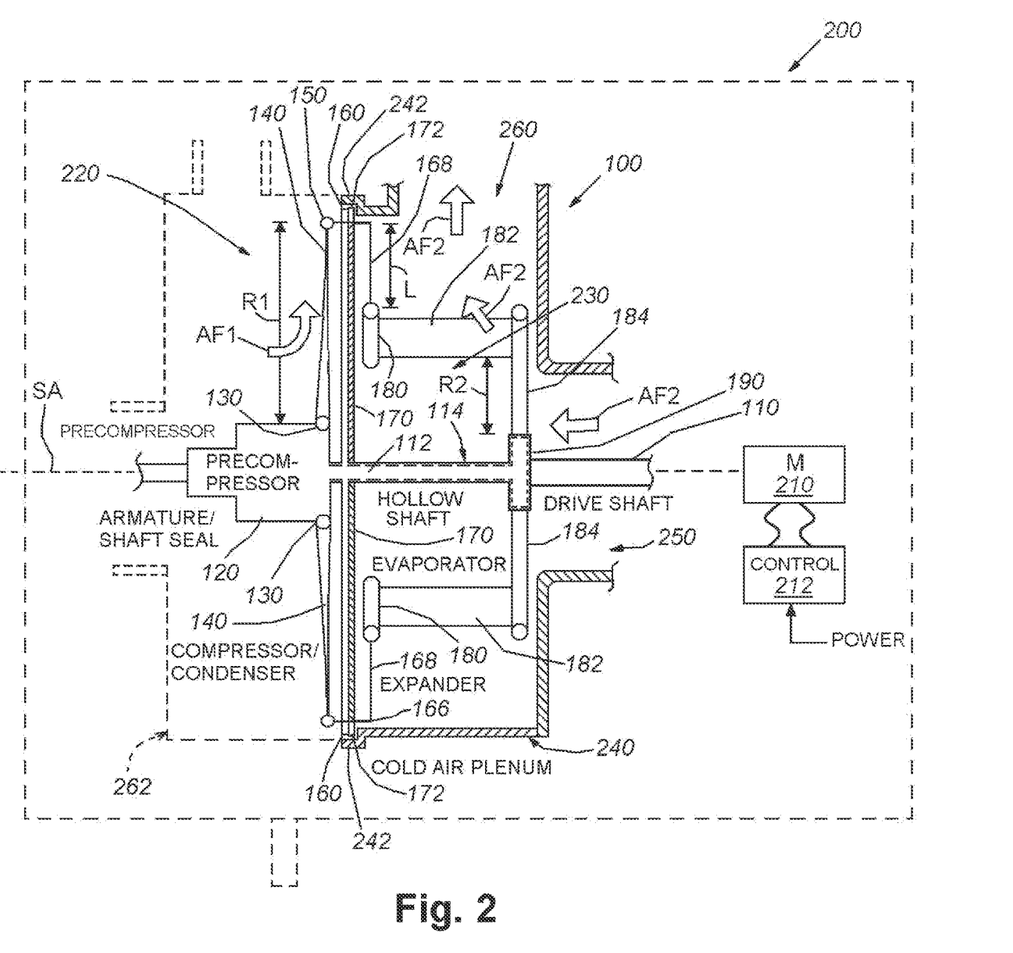
FIG. 2 is a side cross section of the ITCCEE according to FIG. 1.

Reference is made to an isothermal turbo-compressor-condenser-expander-evaporator (ITCCEE) device 100 shown in FIGS. 1 and 2. Similar to the above-incorporated '733 patent, describing an isothermal turbo-compressor-condenser-expander ITCCE, the illustrative ITCCEE is comprised as a rotating air-heat exchange device in which components of the heat-exchange cycle are contained integrally on the same rotating drive shaft. Notably, the illustrative embodiment of the ITCCEE is free of rotary fluid unions for increased reliability, and efficiency. To eliminate the use of rotary fluid unions, the positive displacement precompressor and evaporator are repositioned and integrated with the overall rotating, central axial assembly.

In this embodiment, the device 100 includes a drive shaft 110 that is operatively connected by any acceptable power transmission assembly to a drive motor 210 that rotates (curved arrow R) the shaft at a fixed, or typically, variable speed, based upon a motor controller 212. The motor 210 and controller 212 can be connected to a battery or wall-outlet power source or can be rotatably driven by another form of drive such as an internal combustion engine, wind/water turbine, or vehicle drive train. The drive shaft 110 can be supported in a frame or housing by appropriate rotary bearings (not shown). The drive shaft is hollow, including an axially-oriented lumen 112 along at least a portion 114 of the shaft 110 as shown. This lumen 112 allows fluid to be carried axially (i.e. on shaft axis SA) along the rotating assembly.

Illustratively, a shaft-mounted precompressor 120 draws low pressure refrigerant vapor through the hollow portion 114 of the shaft 110, and discharges it at intermediate pressure into a toroidal inner plenum 130 that surrounds the precompressor 120. The inner plenum interconnects an arrangement of radially aligned spokes that are defined by axially twisted blades/conduits 140 (twisted about a longitudinal/elongation axis). The conduits 140 each carry one or more conduits that allow passage of liquid therealong as air is biased axially and radially (airflow arrow AF1) over the conduits 140 in response to their rotation and associated twist geometry. This airflow passage causes cooling of the precompressed fluid as well as additional compression in response to the centripetal force generated by rotation. Thus, the conduits act as compressors and condensers within the condenser section/space 220 of the device 100. This function, and associated blade structures, are both described further in the above-incorporated '733 patent. The compressed and condensed fluid is directed radially outwardly along a distance R1 into a toroidal outer plenum 150 where it intermixes and the pressure/flow or the fluid is equalized. Note that the conduits can be constructed as a symmetrical-cross-section or asymmetrical-cross-section (e.g. airfoil) shape using, for example extrusion techniques in which a plurality of ports are formed down the elongated length of the conduit. The multiple ports carry the fluid between the plenums 130, 150 and afford greater surface contact between the fluid and conduit material (e.g. aluminum alloy with brazed plenum joints) for more-efficient heat exchange with the ambient air (airflow AF1) passing over the conduits 140. The construction of multi-port conduit extrusions, toroidal plenums and other structures described herein is shown and described, by way of non-limited example, in commonly assigned U.S. patent application Ser. No. 14/543,868, filed Nov. 17, 2014, entitled TURBO-COMPRESSOR-CONDENSER-EXPANDER, the teachings of which are expressly incorporated herein by reference.

Thus, the plenum-interconnecting, axially twisted (along an elongation direction/longitudinal axis) conduit extrusions (in the manner of a helix) serve as flow conduits radially outwardly, and comprise the compressor/condenser heat exchange surface that also serves to induce a flow of air by its combined axial and radial fan characteristics when rotated. The precompressor 120 can be constructed using a variety of known arrangements, including a scroll, rotary, axial piston or other suitable type of adiabatic gas compressor. As described generally above, in various embodiments, the precompressor 120 can be driven by a motor (210) comprising a mechanically sealed shaft drive connected to a stationary fixture/frame (not shown in FIGS. 1 and 2), a separate motor shaft (as shown and described in the '733 patent), a magnetic coupling, and/or 'canned' electrical armature surrounded by stator wiring.

The fluid path of compressed, condensed refrigerant through the extruded conduits is collected in the outer toroidal plenum 150, and then directed through a plurality of axially parallel conduits 160 arranged around the perimeter of the device, which pass through a plurality of corresponding slots 162 in a barrier disc 170 that rotates with the shaft 110. The barrier disc 170 deflects the airflow (arrow AF1) from entering the evaporator section/space 230 of the device, thus isolating the ambient air from the evaporator and cooled space airflow (arrows AF2). The outer edge 172 of the barrier disc 170 seats within a sealing recess (e.g. a loose seal) 242 in a fixed drum-shaped cold air plenum 240. The fluid then passes from the axial conduits 160 around a right angle bend 166 into a plurality of radially inwardly directed, unitary (or integral) conduit sections 168 that can be constructed as multiport planar extrusions. These lead into integral tubular sections 180 that join axially directed conduits 182 that can be constructed as multiport extrusions. In this location, the fluid is isentropically and, subsequently, isothermally expanded as the liquid refrigerant is reduced in pressure and evaporates (i.e. an expander/evaporator section of the device, contained within the cold air plenum space 230.

The expander/evaporator heat exchange surface, comprised of planar multiport conduit extrusions 182, also serves to induce a flow of air (arrows AF2) in the manner of a radial 'squirrel cage' blower due to their radially aligned geometry. Note that a different conduit blade-cross-section geometry can be employed where airflow (arrows AF2). The air flows from the cooled space (e.g. a room or crew compartment) through an axially aligned intake 250 in the cold air plenum 240, over the rotating expander/evaporator conduits 182 and out an outlet 260, located along a portion of the plenum surface, where the cooled air is returned back into the cooled (room) space.

The evaporator superheats the exiting refrigerant vapor via heat exchanged with warm intake airflow from the cooled space which is then returned down a corresponding radially inwardly directed tubes 184 over a radial distance R2 to a central hub 190 rotating on the hollow shaft section 114 about the axis SA. Thus the fluid passes through the shaft lumen 112 under precompressor suction back to the precompressor 120.

In an illustrative embodiment, the evaporator section/space 230 is contained within a stationary cold air plenum 240, interfaced with a barrier disc 170. The barrier disc 170 can be layered with a suitably insulating material, and as described above, is sealed around the disc perimeter 172 against substantial air leakage with suitable structures/techniques such as close mechanical fit into a plenum slot 242, labyrinth or whisker seals, or any other suitable structure or technique for sealing two rotating surfaces against excessive air passage therebetween. The condenser section 220 is shown as an open system, but optionally can also be contained within a separate air plenum 262 (shown in phantom) that can be part of an overall housing (e.g. the outer housing 200 (shown in phantom) of a window air conditioner), to direct the condenser side air flow (Arrow AF1), or to maintain a state of equalized or nearly equalized pressure between the plenums to manipulate the direction and amount of leakage between them down to zero as required, or a direction and amount to adjust the amount of fresh make up air, from the exterior ambient environment, and relative humidity as desired.

As shown in FIG. 2, the dimensional characteristics of the compressor radius R1, the expansion length L, and the evaporator radius R2 can be manipulated for the desired degree of compression and expansion appropriate for a selected refrigerant or process conditions, independent of rotational speed, and to facilitate the proper sizing of heat transfer area between the condenser and evaporator surfaces, and the air flow characteristics of the condenser and evaporator devices, addressing a limitation of the devices disclosed in the '733 patent. Appropriate sizing for a given heat-exchange task can be determined based upon empirical calculations known to those of skill and with the aid of trial and error experimentation by varying the lengths of various components and/or their volumetric/mass-flow carrying capacity.

II. Thermodynamic Process

The '733 patent discloses devices and a thermodynamic process that makes use of the centrifugal field and the Coriolis force to conduct substantially isothermal compression (or an endoreversible sequence of adiabatic and isothermal compressions), and isentropic expansion. The various embodiments of the device in the '733 patent provide a configuration that is tolerant of 'wet' expansion and relatively straightforward to manufacture. However, the device falls short (as in all real processes) of the theoretical ideal minimum energy consumption, described by the reversed Carnot thermodynamic cycle (for refrigeration).

Figure 3:
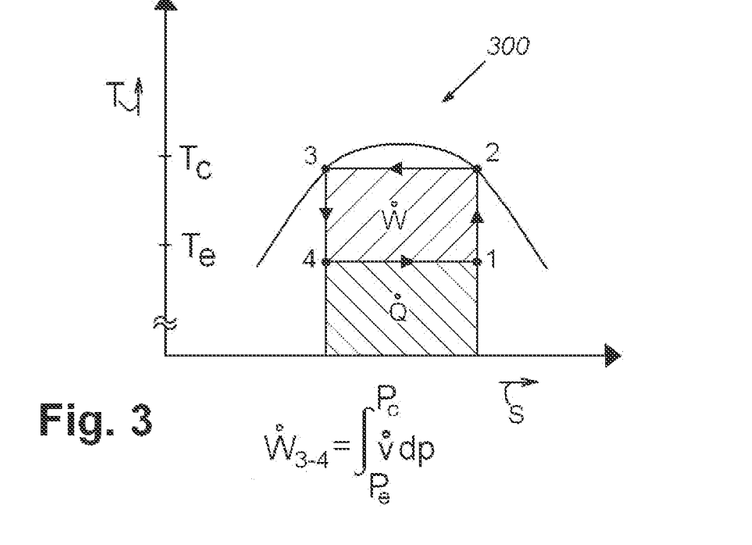
FIG. 3 is a graph taken along temperature and entropy axes of a reversed Carnot cycle with wet adiabatic compression.

It is an object of the present invention to more closely follow the reversed Carnot cycle and approach the theoretical efficiency desired in the '733 patent device configuration. FIG. 3 depicts a graph 300 the reversed Carnot thermodynamic cycle in temperature (T) and entropy (S) coordinates. The steps of isentropic adiabatic compression occur on segment 1-2, condensation on segment 2-3, isentropic expansion on segment 3-4, and evaporation on segment 4-1. The net energy W required for the Carnot cycle conducted between Te and Tc is the area contained within region 1-2-3-4, and the net refrigeration Q produced is the area beneath segment 1-4 extended to the origin. For an isentropic liquid expansion from 3 to 4, the amount of energy produced is the change in specific volume or 'V dP work'. While the '733 patent discloses a device that can plausibly extract this energy, it is a modest amount when limited to only expansion of the condensed high pressure liquid refrigerant.

Figure 4:
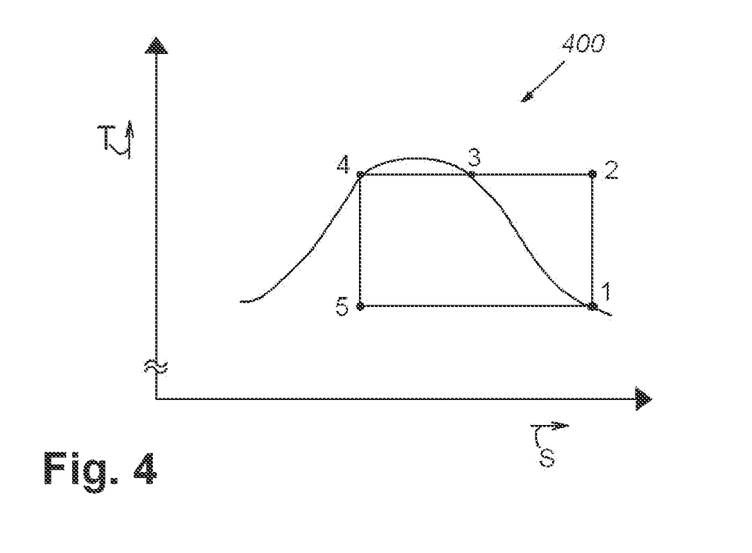
FIG. 4 is a graph taken along temperature and entropy axes of a reversed Carnot cycle with dry compression, wet isothermal compression and condensation as provided by the device of FIGS. 1 and 2.

FIG. 4 shows a graph 400 depicting the same reversed Carnot cycle as that of the graph 300 in FIG. 3, herein modified to avoid the presence of liquid refrigerant in the isentropic compression step, which can cause mechanical difficulties to the illustrative configuration. Refrigerant vapor is compressed isentropically on segment 1 to 2, and compressed isothermally on segment 2 to 3. Condensation occurs between 3 and 4, followed by expansion between 4 and 5, and evaporation between 5 and 1. Notably, this is the proposed path followed by the device and process in the '733 patent, with an adiabatic precompressor, followed by an isothermal compression and condensation, and then an isentropic expansion stage. The net energy W between stage 3-4 can be characterized by the following equation:

$$\dot{W} = \int_{Pe}^{Pc} \dot{V} dP$$

Figure 5:
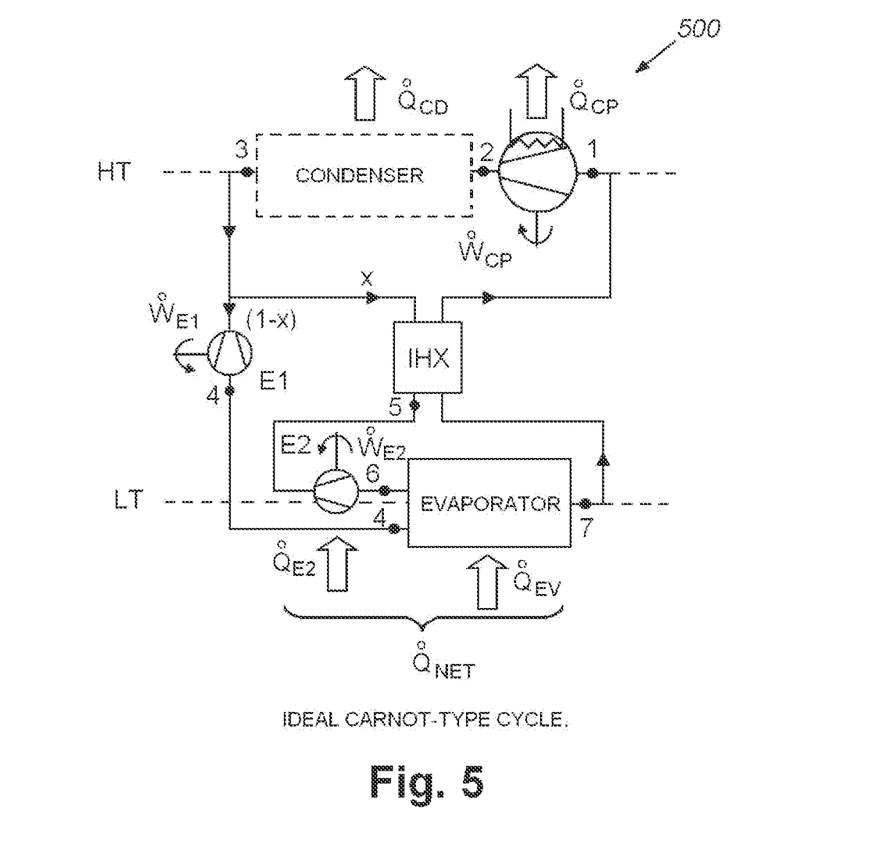
FIG. 5 is a flow circuit diagram of a device employing an ideal Carnot-type cycle.

FIG. 5 shows a flow circuit diagram 500 of the devices and steps necessary to conduct the reversed Carnot cycle (See by way of useful background Clausse et al., International Journal of Refrigeration 31 (2008) 1190-1197. Significantly, the presence of an isothermal expansion step provides additional cooling duty and energy output to supply a fraction of the net work required to operate the compression.

The centrifugal field and Coriolis forces of the expanding refrigerant, and the increase in specific volume (and resultant acceleration and torque) are as relevant and effective in the now-rotating evaporator of the illustrative embodiment herein as they are in the expander section described in the '733 patent. Advantageously, the energy of expansion is now more fully harvested to conduct the overall compression steps required. The improved heat-transfer/exchange effects of the rotating device and centrifugal field (film drainage, forced convection) present for the isothermal compressor and condenser section in the '733 patent are also conferred upon the evaporator of the illustrative embodiment.

The illustrative embodiment herein also reduces the number of prime movers required, in that a common shaft connected to as few as one motor serves to integrate the energy required to operate both compression steps as well as the fan pumping energy for the air flows in both the condenser and evaporator, compared to as many as three motors for a condenser fan, evaporator air handler, and refrigerant compressor in a conventional vapor-compression refrigeration process.

While it is not the aim of the present invention to provide a thermodynamic process for the transformation of heat into work, but rather that of work into heat flow from cold to hot, it is noted that this device has the potential to conduct the Carnot process to produce mechanical work when energized in the manner of a turbine and heated by a source such as flue gas from a combustor, while rejecting heat to an atmospheric heat sink through an air-cooled condensing heat exchanger.

III. Reversible Heat-Pump-Type Device

The above-described illustrative embodiment is particularly suitable for switching from heating to cooling, in the manner of a combined heat pump/air conditioning device, in that the air flow can be reversed from indoors to out through ducts, plenums and diverters in a manner known to those of skill, rather than reversing the refrigerant flow direction, as is commonly practiced. That is, the airflow of the indoor space can be exposed to the compressor/condenser section 220 in a heating cycle, while the external environment is exposed to the expander/evaporator section 230.

Figure 6:
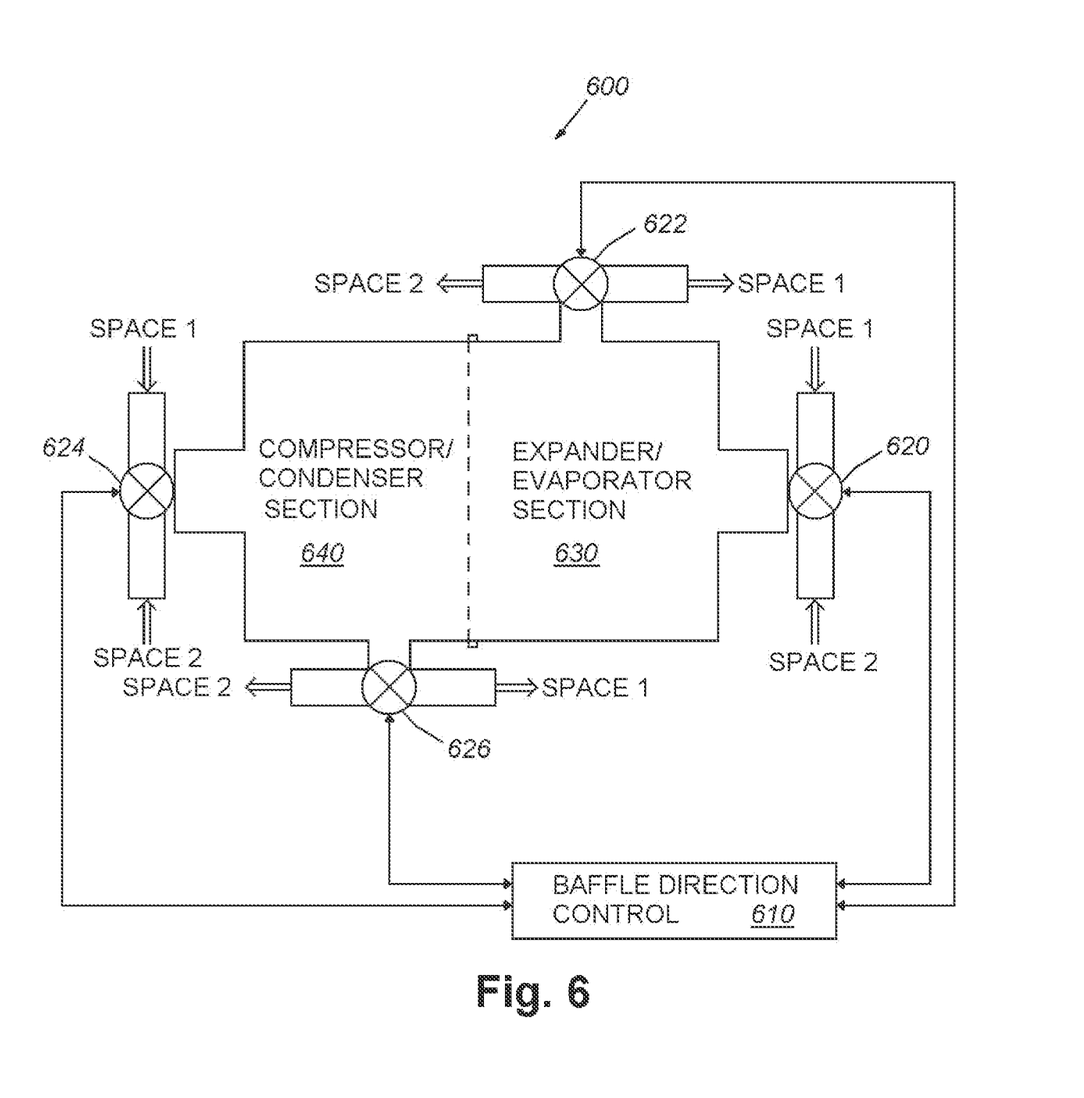
FIG. 6 is a schematic diagram of a reversible heat-pump-type system in which diverters and plenums are selectively controlled to provide heating or cooling to a selected space based on the flow of air through either the compressor/condenser section or the expander/evaporator section, respectively.

With reference to FIG. 6, a reversible heat-pump arrangement 600 is shown, in which a space (Space 1 or Space 2) can be provided with either cooled air flow or warmed air flow based upon the selection of a user via a control 610 that actuates a set of (e.g. electrically actuated) diverters (e.g. baffles) 620, 622, 624 and 626. These baffles are located at the inlet and outlet of each plenum. As depicted, baffles 620 and 622 are located, respectively, at the inlet and outlet of the device's expander/evaporator section 630, whilst baffles 624 and 626 are located at the respective inlet and outlet of the compressor/condenser section 640. The baffles move synchronously between two opposing positions to channel air from either Space 1 or Space 2, depending upon whether cooling or heating is desired. In this manner the destination and source of cold and hot air can be changed without (free of) changing the running direction (rotation) of the device. Appropriate ducting and ports to each space (e.g. indoors and outdoors) are provided and are not shown herein.

IV. Conclusion

It should be clear that the illustrate embodiment provides a highly efficient and straightforward to manufacture/service heat-exchange device. The device can be scaled to operate in a wide range of different applications, and in particular to those benefitting from a self contained system with a minimal number of parts and prime movers, such as a window air conditioning unit.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, terms such as "up", "down", "side", "top", "bottom", "inside", "outside", and the like, are meant as conventions only and not as absolute directions/orientations. Also, it is expressly contemplated that the refrigerant used is highly variable and can include various hydrofluoroolefin analogues. Such analogues can include, but are not limited to DR-2, HFO1234yf, and DR-11, (e.g.) HFO1234ze and similar compounds, as well as those that can be developed in the future, from such well-known international manufacturers, such as Honeywell and DuPont. Accordingly, this description is meant to be taken only by way of example, and not to otherwise limit the scope of this invention.

What is claimed is:

1. A reversible heat pump comprising:
a turbo-compressor-condenser-expander-evaporator (TCCEE) for a refrigerant comprising,
a central axis assembly including a first compressor stage that provides isentropic adiabatic mechanical compression in the refrigerant, and a second compressor stage, that provides isothermal centrifugal compression in radially expanding refrigerant-filled conduits, the conduits being arranged in surfaces to induce heat transfer and a first air flow to remove heat of compression and condensation;
the central axis assembly including an expander and evaporator stage, receiving the compressed and condensed refrigerant from the second compression stage, and that provides isentropic centrifugal expansion and isothermal expansion and evaporation in radially contracting conduits, the conduits being arranged to induce a second air flow over surfaces of the condenser and evaporator;
a prime mover to rotate the central axial assembly to supply energy sufficient to compress refrigerant and circulate the first air flow and the second air flow through the device;
a first plenum, enclosing the first compressor stage and the second compressor stage, and in airflow communication with a space;
a second plenum, enclosing the expander and evaporator stage, and connected to the first plenum, and in airflow communication with the space; and
a diverter arrangement that allows selective inflow from or outflow to the space relative to the first plenum, combined respectively with, outflow to or inflow from the space relative to the second plenum, based upon a heating or cooling call.

2. The reversible heat pump as set forth in claim 1 further comprising an insulated barrier disc attached to the central axle axial assembly to minimize air leakage.

3. The reversible heat pump as set forth in claim 2 wherein the compressor includes a compressor shaft and a compressor shaft anchor attached to an independent motor shaft of the prime mover.

4. The reversible heat pump as set forth in claim 3 wherein the compressor shaft anchor is interfaced into a planetary gear transmission driven from a central axial shaft to drive the compressor shaft at a speed multiple of the central axial shaft.

5. The reversible heat pump as set forth in claim 1 wherein the first compressor stage comprises a shaft-driven mechanical compressor coupled through a sealed shaft or magnetic coupling attached to a stationary anchor.

6. The reversible heat pump as set forth in claim 5 wherein the mechanical compressor comprises a digital scroll compressor and the prime mover rotates at a constant speed.

7. The reversible heat pump as set forth in claim 1 wherein the refrigerant comprises a high-molecular-weight refrigerant working fluid with less than atmospheric pressure compressor suction conditions.

8. The reversible heat pump as set forth in claim 7 wherein the refrigerant comprises at least one of R-123, DR-2, HFO1234yf, DR-11, or HFO1234ze.

9. The reversible heat pump as set forth in claim 8 wherein the expander and evaporator stage receives the compressed and condensed refrigerant from the second compression stage via a plurality of axially parallel conduits arranged around a perimeter of the TCCEE.

10. The reversible heat pump as set forth in claim 1 wherein the diverter arrangement includes at least two baffles located between the first plenum and the space and at least two baffles located between the second plenum and the space.

11. The reversible heat pump as set forth in claim 10, further comprising a controller for selectively closing one of the at least two baffles at least two baffles and opening one of the at least two baffles located between the first plenum and the space and opening one of the at least two baffles located between the second plenum and the space and closing one of the at least two baffles located between the second plenum and the space.

12. The reversible heat pump as set forth in claim 11 wherein the space defines a plurality of enclosures, each interconnected to each of the first plenum and the second plenum by ductwork.

* * * * *